Figure 1:
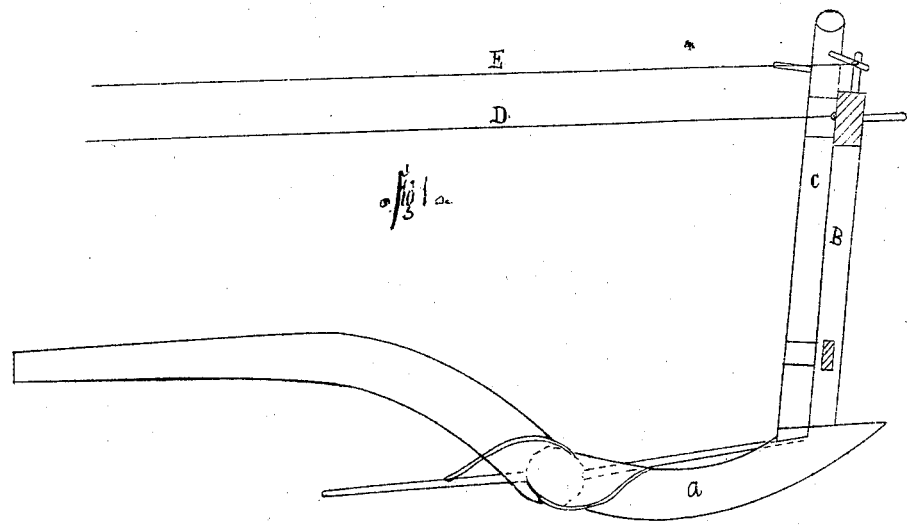

W. Matthews.
Revolving Rake.

No. 94425.   Patented Aug. 31. 1869.

Witnesses
Robt B Carter
Anselm T Holcomb

Inventor
Wm Matthews

United States Patent Office.

WILLIAM MATTHEWS, OF VINTON, OHIO.

Letters Patent No. 94,425, dated August 31, 1869.

HORSE HAY-RAKE.

The Schedule referred to in these Letters Patent and making part of the same.

*To all whom it may concern:*

Be it known that I, WILLIAM MATTHEWS, of Vinton, in the county of Gallia, and State of Ohio, have invented new and useful Improvements in Horse Hay-Rakes; and I do hereby declare that the following is a full and exact description of the same, reference being had to the accompanying drawings, and to the letters of reference marked thereon.

This invention relates to certain improvements in horse hay-rakes; and consists mainly of a rocker-frame and foot-post, so constructed and arranged as to cause the rake to revolve, when desired, and also to be elevated for the purpose of passing over obstructions when necessary.

The details of construction and manner of operation will be fully described hereinafter.

In the drawings—

Figure 2:
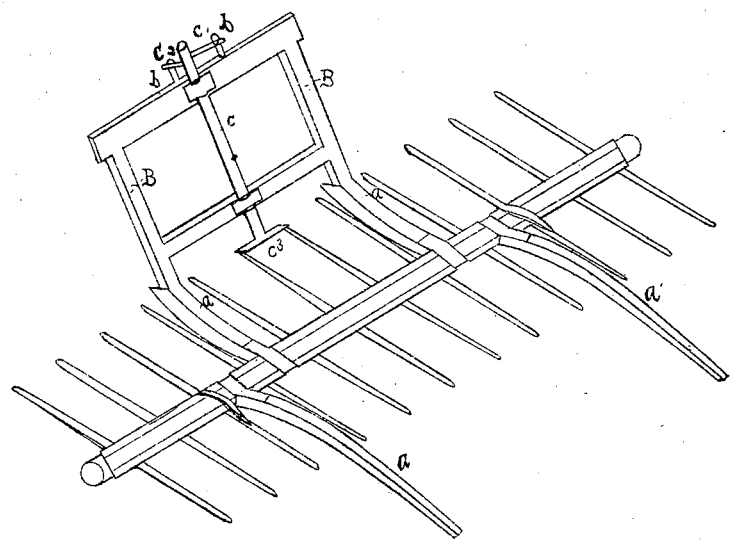

Figure 1 represents a perspective view of a horse-rake with my improvement attached, and Figure 2, a transverse section of the same.

To enable those skilled in the art to which my invention appertains, to make and use the same, I will now proceed to describe its construction and operation.

$a\ a$ represent sections or arms, constructed of curved pieces of wood, and intended for use either in revolving the rake, when loaded with hay, or in elevating the teeth for the purpose of passing over obstructions.

B B represent a frame, securely attached to the rockers $a\ a$, which rises upward a sufficient distance to bring the upper bar conveniently near the operator.

$c$ represents a post, turning in suitable bearings in the frame B, which is provided with an arm, $c^1$, handle $c^2$, and foot-piece $c^3$.

This foot-piece is of peculiar shape. It rests, when in position, upon two of the teeth only, and is constructed with one or both of its ends pointed in shape, so that by a slight turn of the post, it passes in between the teeth, and permits the rake to revolve.

$b\ b$ represent stops, which limit the movement of the post in either direction.

E D represent rods, the former of which is attached to the handle $c^2$ of the post $c$, and the latter of which is attached to the frame B.

By means of these, the rake can be operated from a sulky. It may be attached to the latter by means of the shafts $a'\ a'$.

From this description, the operation of my improved rake will be readily understood.

When it is desired to revolve the rake, the post $c$ is turned (one-eighth of a revolution being sufficient) either directly or through the medium of the rod E, the frame B being at the same time thrown backward.

By this means the centre and rear parts of the rake are elevated, the rockers $a\ a$ acting as levers, and, the front teeth necessarily catching in the ground, the rake is thrown over.

When it is desired to pass over an obstruction, the frame B is moved backward without turning the post $c$, by which means the front teeth are elevated from the ground.

If desired, a spring may be used to throw the foot into position again as the rake revolves.

The frame B should be set far enough back upon the rockers to permit the teeth to pass without interference.

Having thus fully described my invention,

What I claim, and desire to secure by Letters Patent of the United States, is—

1. The post $c$, with foot-piece $c^3$, when constructed as described, and arranged to operate in connection with the rake, in the manner set forth.

2. The frame B, rockers $a$, and foot-piece $c^3$, when combined and arranged in the manner and for the purpose set forth.

This specification signed and witnessed, this 7th day of October, 1868.

WM. MATTHEWS.

Witnesses:
R. D. EDWARDS,
ROBT. B. CARTER.